United States Patent [19]

Carter

[11] Patent Number: 5,016,932
[45] Date of Patent: May 21, 1991

[54] BUMPER WITH STORAGE COMPARTMENT

[76] Inventor: Robert E. Carter, P.O. Box 156, Pleasant Grove, Utah 84062

[21] Appl. No.: 494,329

[22] Filed: Mar. 16, 1990

[51] Int. Cl.⁵ ............................................. B60R 19/02
[52] U.S. Cl. .............................. 293/106; 224/42.03 A
[58] Field of Search ............................... 293/106, 117; 224/42.03 A

[56] References Cited

U.S. PATENT DOCUMENTS

| | | | |
|---|---|---|---|
| 2,993,721 | 7/1961 | Bowman | 293/106 |
| 3,606,385 | 9/1971 | Johannes | 293/106 |
| 3,614,136 | 10/1971 | Dent | 293/106 |
| 3,905,527 | 9/1975 | Chamberlain | 293/117 |
| 4,674,782 | 6/1987 | Helber | 293/106 |
| 4,893,856 | 1/1990 | Council | 293/106 |
| 4,901,895 | 2/1990 | Gancarz | 293/117 |

*Primary Examiner*—Robert R. Song
*Attorney, Agent, or Firm*—Terry M. Crellin

[57] ABSTRACT

Bumper apparatus for an automotive vehicle, comprises an elongate, hollow housing having opposite ends. The housing is adapted to be mounted adajcent to the end of a motor vehicle. A hinged door is mounted to at least one of the ends of the housing. An elongated container can be received in the housing for sliding in and out of the housing through the end of the housing having the hinged door.

9 Claims, 2 Drawing Sheets

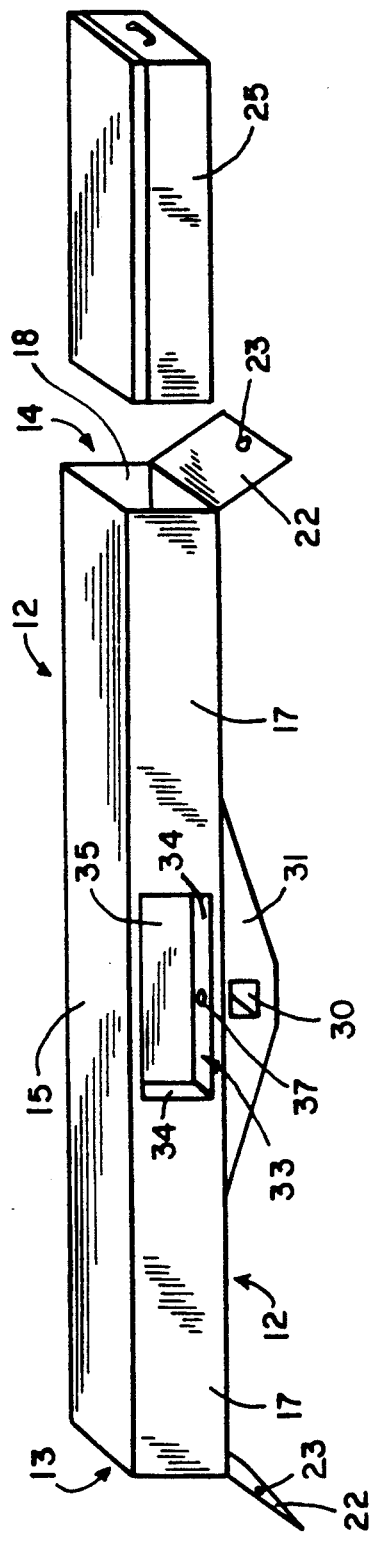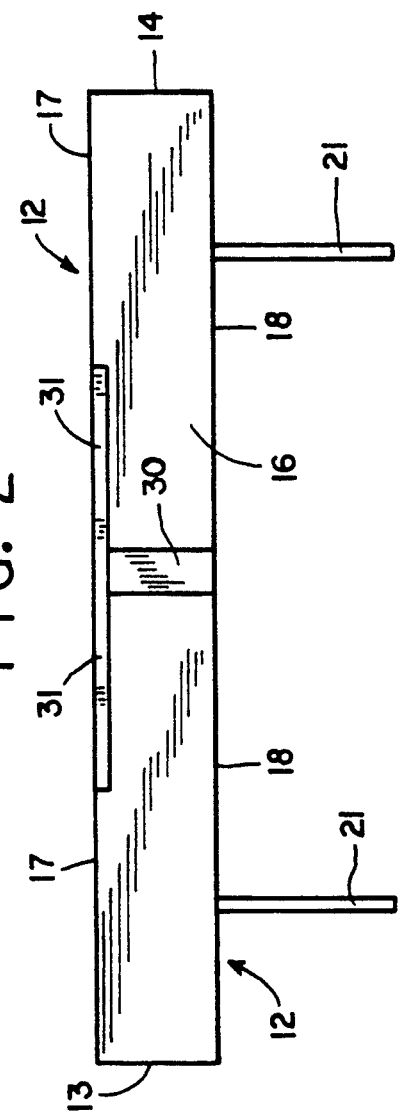

BUMPER WITH STORAGE COMPARTMENT

BACKGROUND OF THE INVENTION

1. Field of the Invention

The present invention relates to bumpers which are attached to an end of a motor vehicle. In particular, the invention relates to a bumper having a storage compartment which is readily accessible, and in a preferred embodiment has a sliding compartment which can be pulled from an end of the bumper.

2. State of the Art

It has been recognized that it is advantageous to utilize the bumper of a vehicle as a storage space as well as the ornamental, decorative purpose normally ascribed to a bumper. Various bumpers having storage capabilities are disclosed in the prior patent art. Universally, the storage box bumpers have been provided with top covers or lids which can be lifted up to expose the storage area within the bumper. Examples of prior patents showing such covers or lids are U.S. Pat. Nos. 3,471,070; 3,501,170; 3,606,385; 3,614,136; 4,138,152; 4,570,986; and 4,674,782.

Such bumpers have two primary drawbacks, however. First, the bumper lacks structural stability because of the open top thereof. To mediate the structural problem, the bumpers must be made of rather heavy metal plate. Even then, minor collisions with the bumper can do substantial damage to the outer facing side and the top of the bumper. The second major drawback is that special efforts must be taken to seal the cover or lid with the body of the bumper to avoid ingress of moisture. Unfortunately, the seal means often becomes impaired or otherwise ineffective, and the storage area within the bumper is subjected to water.

3. Objectives

A principal objective of the invention is to provide an improved bumper of the type having a storage compartment therein, with the bumper having a closed upper surface which achieves improved structural stability as well as superior resistance to moisture penetration into the storage compartment.

A particular objective of the present invention is to provide a preferred embodiment of such an improved bumper comprising an integral housing having closed upper, lower, inner, and outer sides, with at least one of the ends of the housing being open and equipped with a hinged door to provide access to the storage area within the housing.

A further objective of the present invention is to provide such a preferred embodiment of the bumper which further comprises an elongate container which is received in the housing for sliding in and out of the housing through the end of the housing having the hinged door.

A still further objective of the present invention is to provide another preferred embodiment of an improved bumper comprising a hollow, elongate housing having upper, lower, front and back sides with closed ends and an access opening in the front side, and wherein at least one door is hingedly mounted to the housing to close downwardly over the access opening in the housing.

BRIEF DESCRIPTION OF THE INVENTION

The above objectives are achieved in accordance with the present invention by providing a novel, improved bumper apparatus for an automotive vehicle such as a pickup truck. The bumper comprises an elongate, hollow housing that is mounted at the end of the motor vehicle as is a conventional bumper. The housing forming the bumper has upper, inner and outer facing sidewalls or surfaces as well as opposite ends. The upper and lower sidewalls are formed of solid plates integrally joined to the inner sidewall which is also a solid plate. The solid plates provide structural integrity and strength to the unit.

In a particularly preferred embodiment of the invention, the outer sidewall is also formed of a solid plate and integrally joined to the upper and lower sidewalls to form a tubular housing having a substantially rectangular cross section. Such a tubular construction has exceptional structural strength and integrity. A hinged door is mounted to one of the ends of the housing, and preferably both ends of the housing are provided with such doors. The doors provide access to the hollow storage compartment within the tubular housing forming the bumper. Advantageously, at least one elongate container is provided having a perimeter dimension and shape to be received in the ends of the housing for sliding movement in and out of the housing. A container can be provided for each end of the housing. The containers provide easy means for withdrawing contents from the storage compartment in the bumper.

In another aspect or embodiment of the invention, the ends of the housing are closed by end plates integrally attached to the upper, lower, inner and outer sidewalls of the housing. At least one access opening is provided in the outer sidewall of the housing, i.e., the sidewall facing away from the vehicle on which the bumper is installed. A door is hingedly mounted to the housing for pivotal movement to close the access opening.

Additional objects and features of the invention will become apparent from the following detailed description, taken together with the accompanying drawings.

THE DRAWINGS

Preferred embodiments of the present invention representing the best mode presently contemplated of carrying out the invention are illustrated in the accompanying drawings in which:

FIG. 1 is a pictorial representation of one preferred embodiment of a bumper in accordance with the present invention;

FIG. 2 is a bottom view of the bumper of FIG. 1; and

DETAILED DESCRIPTION OF THE ILLUSTRATED EMBODIMENTS

Figure 3:
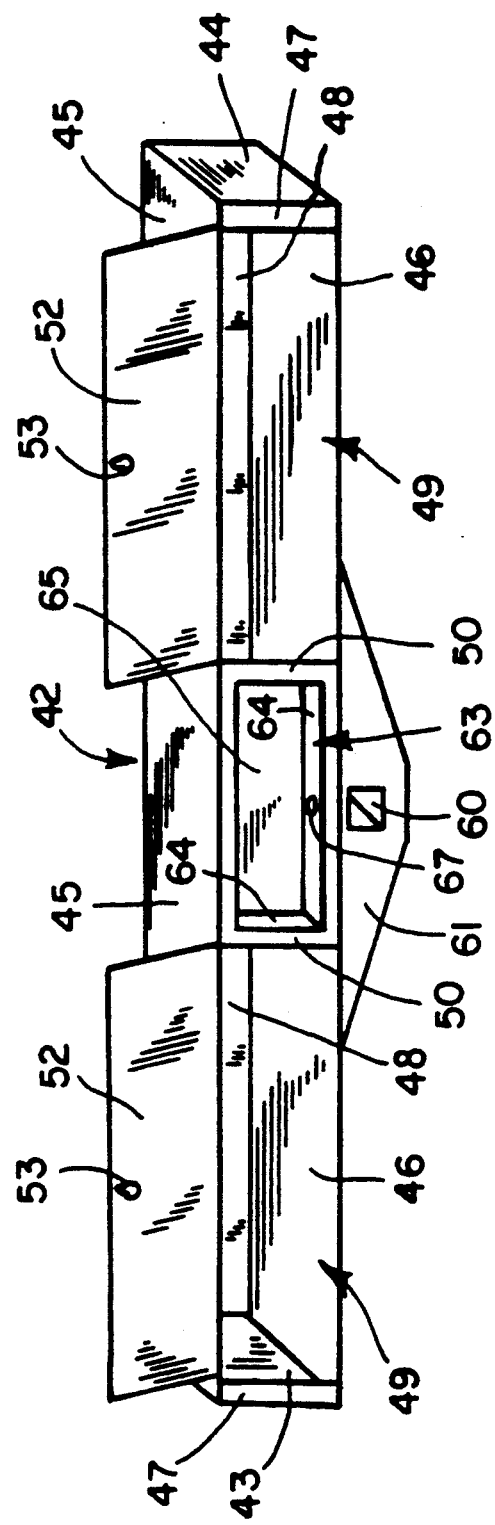
FIG. 3 is a pictorial representation of another preferred embodiment of a bumper in accordance with the present invention.

A particularly preferred embodiment of bumper apparatus for an automotive vehicle in accordance with the present invention is illustrated in FIGS. 1 and 2 of the drawings. The bumper comprises an elongate, hollow housing 12 having opposite ends 13 and 14 and upper, lower, inner and outer sidewalls or surfaces 15, 16, 17, and 18, respectively. The sidewalls 15, 16, 17, and 18 are preferably made of solid steel plate and form a continuous, tubular housing having a substantially rectangular cross section. The tubular housing 12 is sealed except at its opposite ends from moisture, oil, grease and dirt penetrating the hollow storage compartment formed in the housing 12. The tubular housing 12 further has optimum strength and structural integrity.

Means are provided for mounting the housing 12 adjacent to the end of a motor vehicle (the motor vehicle is not shown in the drawings). As shown in FIG. 2, support members 21 are attached to the housing 12 and extend from the inner sidewall 18 for connection to the frame of a vehicle so that the bumper can be mounted to the vehicle with the outer sidewall 17 thereof facing away from the end of the vehicle.

At least one of the ends of the housing 12 is provided with a hinged door 22. As illustrated, hinged doors 22 are mounted to each of the ends 13 and 14 of the housing 12. The doors 22 are preferably attached to the ends of the lower sidewall 16 to pivot about an axis parallel with the respective ends of the sidewall 16. The doors 22 close to cover the respective, otherwise open ends 13 and 14 of the housing 12. The doors 22 are pivoted downwardly to expose the full extend of the open ends 13 and 14 for access to the storage compartment formed in the hollow housing 12. Locking attachment latches 23 are advantageously provided to secure the doors 22 in the closed position. The latches 23 are operated by a locking key in conventional manner.

The elongate, storage compartment formed by the housing 12 makes ideal storage for elongate items such as a bumper jack and lug wrench used in changing tires on the vehicle as well as other elongate items. The items are readily slid into the storage compartment through the open ends 13 and 14. The doors 22 provide a locking closure to seal the storage compartment and provide security for the items contained in the storage compartment. It is highly advantageous to further provide an elongate container 25 having a perimeter dimension and shape to be received in the housing 12. The container 25 slides in and out of the storage compartment formed by the housing 12 through an end 13 or 14 of the housing 12.

Both ends of the housing 12 can be provided with a sliding container 25, or one of the ends can be left as is to receive elongate items such as the jack and lug wrench as mentioned above. The container 25 can either be an open topped container or it can be provided with a cover or lid. When provided with a cover or lid, the items stored in the container 25 located in the storage compartment are in effect totally immune from moisture, oil, grease, and dirt. The items are readily accessible by simply pulling the container 25 from the open end of the housing 12 after the door 22 at that end has been opened.

It is advantageous to further include on the bumper apparatus of the present invention mounting means for connecting a trailer hitch to the bumper. As shown in Figs. 1 and 2, the mounting means comprises an elongate, hollow receiver 30 positioned adjacent to the lower side surface of the housing 12. The receiver 30 has an open end facing away from the end of the vehicle so as to be capable of accepting the shaft of a ball hitch (not shown in the drawings) longitudinally therein. As illustrated, a mounting plate 31 advantageously extends downwardly from the housing 12 at the open end of the receiver 30. The mounting plate 31 has an opening which registers with the open end of the receiver 30. The mounting plate 31 serves an aesthetic purpose as well as providing additional structural support for mounting the receiver 30 to the housing 12.

It is further advantageous to provide on the bumper apparatus of the present invention means for mounting a license plate to the housing 12. The license plate mounting means preferably comprises a recessed well 33 formed in the outer sidewall 17 of the housing 12. The well 33 has perimeter sidewalls 34 and a substantially flat inner wall 35, with the license plate being mountable on the inner wall 35. A night light 37 is provided in at least one of the sidewalls 34 of the recessed well 33 for illuminating the license plate.

A second preferred embodiment of bumper apparatus in accordance with the present invention is shown in FIG. 3. As illustrated, the bumper comprises an elongate, hollow housing 42 having opposite, closed ends 43 and 44. The housing 42 further includes upper, lower and inner sidewalls or surfaces 45, 46, and 48. The sidewalls 45, 46, and 48 and the ends 43 and 44 are made of solid steel plate. Means such as the support members 21 of the embodiment of FIGS. 1 and 2 are provided for mounting the housing 42 adjacent to an end of a motor vehicle (not shown), with the inner sidewall 48 facing the end of the vehicle.

The outer sidewall 47 of the housing 42 is at least partially open, with the outer sidewall 47 facing away from the vehicle. As illustrated, there are two access openings 49 provided in the outer sidewall 47. The outer sidewall 47 is divided into two separate access openings 49 by a divider plate 50 extending between the outer edges of the upper sidewall 45 and the lower sidewall 46. A door 52 is provided for each access opening 49. The doors 52 are hingedly mounted to the housing 42 for pivotal movement between a closed position extending downwardly over the access openings 49 and an open position extending upwardly from the access openings 49. Locking attachment latches 53 are advantageously provided to secure the doors 52 in the closed position. The latches 53 are operated by a locking key in conventional manner.

The solid, closed ends 43 and 44 attached integrally to the solid upper, lower, and inner sidewalls 45, 46, and 48 provide structural strength and integrity to the bumper. The divider plate 50 also provides strength and integrity to the bumper. By being closed at the top, moisture and dirt are effectively kept out of the storage compartment formed within the housing 42. The doors 52 are also made of steel plate and thus further provide strength and integrity to the bumper when the doors 52 are in their closed positions.

Similar to the embodiment of FIGS. 1 and 2, the bumper shown in FIG. 3 advantageously further comprises mounting means for connecting a trailer hitch to the bumper. The mounting means is identical to that shown in FIGS. 1 and 2, comprising an elongate, hollow receiver 60 positioned adjacent to the lower sidewall 46 of the housing 42. The receiver 60 has an open end facing away from the end of the vehicle so as to accept the shaft of a ball hitch (not shown in the drawings) longitudinally therein. As illustrated, a mounting plate 61 advantageously extends downwardly from the housing 12 at the open end of the receiver 30. The mounting plate 61 has an opening which registers with the open end of the receiver 60. The mounting plate 61 serves an aesthetic purpose as well as providing additional structural support for mounting the receiver 60 to the housing 42.

Similar to the embodiment of FIGS. 1 and 2, it is advantageous to provide the bumper apparatus of FIG. 3 with means for mounting a license plate to the housing 42. The license plate mounting means preferably comprises a recessed well 63 formed in the divider plate 50 of the housing 42. The well 63 has perimeter sidewalls 64 and a substantially flat inner wall 65, with the license plate being mountable on the inner wall 65. A night light 67 is provided in at least one of the sidewalls 64 of the recessed well 63 for illuminating the license plate.

Although preferred embodiments of a bumper apparatus of the present invention have been illustrated and described, it is to be understood that the present disclosure is made by way of example and that various other embodiments are possible without departing from the subject matter coming within the scope of the following claims, which subject matter is regarded as the invention.

I claim:

1. Bumper apparatus for an automotive vehicle, comprising an elongate, hollow housing having opposite, closed ends, an outer side surface which is at least partially open, and upper, lower and inner side surfaces which are closed;

means for mounting the housing adjacent to an end of a motor vehicle, with the inner side surface facing the end of the vehicle and with the open outer side surface facing away from the vehicle; and at least one door hingedly mounted at the outer edge of the upper side surface of the housing for pivotal movement between a closed portion extending over the access opening and an open position extending away from said access opening.

2. Bumper apparatus as in claim 1, further comprising mounting means for mounting a trailer hitch to the bumper.

3. Bumper apparatus as in claim 2, wherein the mounting means comprises an elongate, hollow receiver positioned adjacent to the lower side surface of said housing, with the receiver opening away from the end of the vehicle so as to accept the shaft of a ball hitch longitudinally therein.

4. Bumper apparatus as in claim 1, further comprising locking means for engaging said hinged door in a closed position.

5. Bumper apparatus for an automotive vehicle, comprising an elongate, hollow housing having opposite, closed ends, an outer side surface which is at least partially open, and upper, lower and inner side surfaces which are closed;

said outer side surface is divided into two separate, open areas by a divider plate extending between the outer edges of the upper side surface and the lowe sides surface;

means for mounting the housing adjacent to an end of a motor vehicle, with the inner side surface facing the end of the vehicle and with the open outer side surface facing away from the vehicle; and two doors are hingedly mounted at the outer edge of the upper side surface to cover the open areas when the doors are closed.

6. Bumper apparatus as in claim 5, further comprising means for mounting a license plate to said housing.

7. Bumper apparatus as in claim 6, wherein the license plate mounting means comprises a recessed well formed in the divider plate of said housing, said well having perimeter sidewalls and a substantially flat inner wall, with the license plate being mounted on the inner wall.

8. Bumper apparatus as in claim 7, wherein means are provided in the sidewalls of the recessed well for illuminating the license plate.

9. Bumper apparatus as in claim 5, further comprising locking means for engaging said hinged doors in a closed position.

* * * * *